United States Patent [19]
Carney et al.

[11] Patent Number: 6,084,036
[45] Date of Patent: Jul. 4, 2000

[54] CARBOXYL-FUNCTIONAL ADDUCT FROM OH- OR EPOXY-FUNCTIONAL POLYMER AND CITRIC ACID (ANHYDRIDE) WITH ANHYDRIDE

[75] Inventors: Joseph M. Carney, Pittsburgh; Bruce A. Connelly, Gibsonia; James A. Claar, Apollo, all of Pa.

[73] Assignee: PPG Industries Ohio, Inc., Cleveland, Ohio

[21] Appl. No.: 09/145,691

[22] Filed: Sep. 2, 1998

Related U.S. Application Data

[63] Continuation-in-part of application No. 08/928,533, Sep. 12, 1997, Pat. No. 5,891,960, which is a continuation of application No. 08/720,937, Oct. 4, 1996, abandoned.

[51] Int. Cl.[7] .............................. C08L 33/14; C08L 63/02; C08L 67/00; C08L 75/16
[52] U.S. Cl. .......................... 525/454; 525/117; 525/176; 525/207; 525/327.3; 525/328.8; 525/440; 525/528; 525/533
[58] Field of Search ...................... 525/533, 117, 525/176, 207, 327.3, 328.8, 440, 528, 454

[56] References Cited

FOREIGN PATENT DOCUMENTS 50-87187 7/1995 Japan .

*Primary Examiner*—Robert E. Sellers
*Attorney, Agent, or Firm*—William J. Uhl

[57] ABSTRACT

Coating compositions comprising (a) a carboxyl functional adduct which is the reaction product of (i) a compound, polymer or oligomer containing pendant and/or terminal hydroxyl or epoxy functional groups and (ii) citric acid or citric acid anhydride; and (b) an anhydride functional curing agent are disclosed. The coating compositions have accelerated tack-free times and enhanced adhesion to zinc-coated steel substrates without the use of a chrome-containing wash primer.

6 Claims, No Drawings

ABSTRACT

CARBOXYL-FUNCTIONAL ADDUCT FROM OH- OR EPOXY-FUNCTIONAL POLYMER AND CITRIC ACID (ANHYDRIDE) WITH ANHYDRIDE

CROSS REFERENCE TO RELATED APPLICATIONS

This application is a Continuation in Part of U.S. patent application Ser. No. 08/928,533, filed Sep. 12, 1997, U.S. Pat. No. 5,891,960, which is a Continuing Prosecution Application of abandoned U.S. patent application Ser. No. 08/720,937, filed Oct. 4, 1996, abandoned.

BACKGROUND OF THE INVENTION

The present invention relates to curable coating compositions, more particularly to coating compositions which are curable at low or ambient temperatures.

In the area of automotive refinish, repairing a defect in the original coating can involve sanding or grinding out the defect by mechanical means, or completely stripping the whole part or the whole vehicle of its original coating layers. This sanding or grinding process typically results in the exposure of bare metal which is then coated with a coating composition, usually a primer composition.

The automotive industry has, from the mid 1980's, been producing automobiles in which major automotive body parts are made of cold-rolled steel and/or steel which has an outer surface treated with a zinc-containing material. Typically the zinc coated steel used is galvanized or Galvanealed steel. Adhesion of coating compositions to these zinc coated steel substrates is problematic. Also, modification of the coating compositions to improve adhesion to galvanized substrates often impairs adhesion to cold-rolled steel substrates. Chrome-containing wash primers are sometimes used prior to the primer application in an attempt to improve adhesion to these substrates. This incorporates an added step in the refinish painting process and utilizes chrome-containing coatings which are not environmentally desirable.

Thus, it is desirable to provide coating compositions which exhibit enhanced adhesion to cold rolled steel as well as to galvanized and Galvanealed steel substrates, without the use of chrome-containing wash primers.

U.S. patent application Ser. No. 08/720,937, filed Oct. 4, 1996, abandoned, discloses a curable coating composition that has enhanced adhesion to galvanized and Galvanealed steel substrates without the use of a chrome-containing wash primer. The coating composition comprises a film-forming polymer which is the reaction product of (a) a polymer or compound containing pendant and/or terminal hydroxyl or epoxy functional groups and (b) citric acid or citric acid anhydride. These coating compositions can further comprise a curing agent selected from the group consisting of polyisocyanates and aminoplasts. For automotive refinish applications which are usually cured at ambient temperatures, the polyisocyanate curing agents are typically employed.

One disadvantage of these coating compositions which contain a polyisocyanate curing agent is the excessive length of time required for the applied coating to become tack-free to the touch (i.e., "tack-free time"), at which time the primer coating may be sanded. The ability to sand a primer coating as soon as possible after application is desirable for automotive refinish applications due to efficiency and productivity concerns.

It has been found that the use of an anhydride functional curing agent greatly accelerates the tack-free time of the above-described coating compositions while maintaining the same excellent adhesion to galvanized steel substrates without the need for chrome-containing wash primers. Incorporation of a polyisocyanate in the coating composition further improves the adhesion of the coating composition to cold-rolled steel substrates.

SUMMARY OF THE INVENTION

In accordance with the present invention, there is provided a curable coating composition that exhibits enhanced adhesion to cold-rolled steel as well as to galvanized steel substrates without the use of a chrome-containing wash primer. Additionally, the curable coating composition has accelerated tack-free times.

The curable coating composition of the invention comprises the following components:

(a) a carboxyl functional adduct comprising the reaction product of the following reactants:

(i) a compound, polymer or oligomer containing pendant and/or terminal hydroxyl or epoxy functional groups, and (ii) a material selected from the group consisting of citric acid anhydride and citric acid; wherein the carboxyl functionality of the adduct is in a terminal and/or pendant position and is derived from the reaction of the hydroxyl functional groups with citric acid anhydride and/or the reaction of the epoxy functional groups with citric acid; and (b) an anhydride functional curing agent. In a preferred embodiment of the invention the curable coating composition further comprises a polyisocyanate.

As aforementioned, the curable coating composition described immediately above provides accelerated tack-free times while maintaining the excellent adhesion to galvanized steel substrates without the need for chrome-containing wash primer.

It was surprising to find that the addition of a polyisocyanate to the coating composition comprising the anhydride functional curing agent provided excellent adhesion to cold-rolled steel as well as to galvanized steel substrates.

The present invention also provides a coated article comprising a metallic substrate and a cured coating thereon, the cured coating being derived from the coating composition described above.

DETAILED DESCRIPTION OF THE INVENTION

In the curable coating compositions of the present invention, reactant (i), the compound, polymer or oligomer containing pendant and/or terminal hydroxyl or epoxy functional groups, can be selected from a variety of materials. Examples of these materials include polyepoxides, acrylic polymers containing epoxy or hydroxyl groups, polyester polymers containing epoxy or hydroxyl functional groups; and oligomers containing hydroxyl groups.

The polyepoxides used in the practice of the present invention may be saturated or unsaturated, cyclic or acyclic, aliphatic, alicyclic, aromatic or heterocyclic as are known to those skilled in the art. Also, the polyepoxides may contain substituents such as halogen, hydroxyl, and ether groups. Examples of polyepoxides are those polymers having a 1,2-epoxy equivalency greater than one and preferably about two, that is, polyepoxides which have on an average basis two epoxy groups per molecule as are well known in the art. Preferred polyepoxides are polyglycidyl ethers of cyclic polyols. Particularly preferred are polyglycidyl ethers of polyhydric phenols such as Bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis(4-hydroxyphenyl)propane, 1,1-bis(4-hydroxyphenyl)ethane, 2-methyl-1,1-bis(4-hydroxyphenyl)propane, 2,2-bis(4-hydroxy-3-t-butylphenyl)propane, bis-(2-hydroxynaphthyl) methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol; 1,4-cyclohexanediol; 1,2-bis (hydroxymethyl)cyclohexane; 1,3-bis(hydroxymethyl) cyclohexane; and hydrogenated Bisphenol A.

Further examples of the polyepoxide polymers generally are shown in U.S. Pat. Nos. 4,711,917 (columns 5–8); 4,031,050 (columns 3–5); and 3,922,253 (columns 1–2).

The epoxide equivalent weight of the polyepoxide will generally range from 100 to about 2000 and preferably from about 180 to 500. Epoxy group-containing acrylic polymers such as those described in U.S. Pat. No. 4,001,156 (columns 3–6) can also be used.

Chain-extended polyepoxide polymers may also be used and are preferred. Generally, chain extension can be carried out by reacting together a polyepoxide and a polyhydroxyl group-containing material selected from alcoholic hydroxyl group-containing materials and phenolic hydroxyl group-containing materials to chain extend or build the molecular weight of the polyepoxide.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used.

Also, the chain extension of the polyepoxides optionally can be with a polycarboxylic acid material, preferably a dicarboxylic acid. Useful dicarboxylic acids include acids having the general formula: HOOC—R—COOH, where R is a divalent moiety that is substantially unreactive with the polyepoxide. R can be a straight chained or a branched alkylene or alkylidene moiety normally containing from 2 to 42 carbon atoms. Some examples of suitable dicarboxylic acids include adipic acid, 3,3-dimethylpentanedioic acid, benzenedicarboxylic acid, phenylenediethanoic acid, naphthalenedicarboxylic acid, pimelic acid, suberic acid, azelaic acid, sebacic acid and the like. Additional suitable dicarboxylic acids include substantially saturated acyclic, aliphatic dimer acids formed by the dimerization reaction of fatty acids having from 4 to 22 carbon atoms and a terminal carboxyl group (forming dimer acids having from 8 to 44 carbon atoms). Dimer acids are well known in the art. An example of such a diacid is the so-called "dimer acids" and "trimer acids" sold under the name EMPOL® by the Henkel Corporation, Emery Group, Cincinnati, Ohio.

The acrylic polymers are copolymers of one or more epoxy group-containing, ethylenically unsaturated monomers, or hydroxyl group-containing, ethylenically unsaturated monomers, and one or more alkyl esters of acrylic acid or methacrylic acid optionally together with one or more other polymerizable ethylenically unsaturated monomers. These polymers may be either of the thermoplastic type or the thermosetting crosslinking type.

Suitable epoxy group-containing, ethylenically unsaturated monomers are those containing 1,2-epoxy groups and include glycidyl acrylate, glycidyl methacrylate and allyl glycidyl ether.

Suitable hydroxyl group-containing, ethylenically unsaturated monomers include hydroxyethyl acrylate, hydroxyethyl methacrylate, hydroxypropyl acrylate, and hydroxypropyl methacrylate. Also allyl alcohol or oxyalkylated monomers such as oxyalkylated acrylic and methacrylic acid may be used. Additionally, hydroxy monomers chain extended with caprolactone may also be used Suitable alkyl esters of acrylic acid or methacrylic acid include methyl methacrylate, ethyl methacrylate, butyl methacrylate, ethyl acrylate, butyl acrylate, and 2-ethyl hexyl acrylate.

Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate.

Citric acid anhydride may be produced by any of the methods known in the art. For example, citric acid can be reacted with acetic anhydride in the presence of a mineral acid catalyst such as phosphoric acid or sulfuric acid, preferably phosphoric acid, at temperatures ranging from 55 to 100° C. Typically the mole ratio of citric acid to acetic anhydride is about 3:1 to 5:1, preferably from about 3:1 to 4:1. The acetic acid formed in the reaction and any residual acetic anhydride can then be removed by distillation under a vacuum.

In addition to reacting the citric acid anhydride with an acrylic polymer having pendant and/or terminal hydroxyl groups, a carboxyl functional adduct can first be formed by reacting the citric acid anhydride with one of the hydroxyl group-containing, ethylenically unsaturated monomers, and then under free radical polymerization conditions, further reacting the adduct with at least one other ethylenically unsaturated monomer, such as those described above, to form the carboxyl functional polymer. Likewise, a carboxyl functional adduct can be formed by reacting the citric acid with one of the epoxy group-containing, ethylenically unsaturated monomers and then under free radical polymerization conditions, further reacting the adduct with at least one other ethylenically unsaturated monomer, such as those described above, to form the carboxyl functional polymer.

Besides hydroxyl group-containing acrylic polymers, hydroxyl group-containing polyester polymers and oligomers can be used. Such materials may be prepared in a known manner by reaction of polyhydric alcohols and polycarboxylic acids or anhydrides. Suitable polyhydric alcohols include ethylene glycol, propylene glycol, butylene glycol, 1,6-hexylene glycol, neopentyl glycol, diethylene glycol, glycerol, trimethylol propane, and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

As mentioned above, citric acid may be reacted with a polymer or oligomer containing terminal and/or pendant epoxy groups. The citric acid is typically present in an amount ranging from about 5 to about 15 weight percent, preferably from about 7 to about 10 weight percent, based on weight of total resin solids. The reaction times and temperatures may be those that are known in the art for such reactions. Suitable reaction conditions may be, for example, at temperatures ranging from about 60 to 150° C., preferably from about 80 to 120° C. for about 1 hour to 8 hours.

The citric acid anhydride is reacted with a polymer or oligomer containing pendant and/or terminal hydroxyl groups. The citric acid anhydride is typically present in an amount ranging from about 5 to about 50 weight percent, preferably from about 10 to about 30 weight percent, based on weight of total resin solids. The reaction times and temperatures may be those that are known in the art for such reactions. Suitable reaction conditions may be, for example, at temperatures ranging from about 60 to 150° C., preferably from about 80 to 90° C. for about 1 hour to 8 hours.

Additionally, the curable coating composition comprises an anhydride functional curing agent to facilitate cure of the coating. The anhydride functional curing agent of the composition is a material containing at least two carboxylic acid anhydride groups in the molecule. The anhydride functional groups of the curing agent are reactive with the oligomer or polymer containing unreacted pendant or terminal hydroxyl groups; the hydroxyl groups which are present in the pendant or terminal citric acid and/or citric acid anhydride groups which are present after reaction with the pendant or terminal hydroxyl or epoxy functional groups of the oligomer or polymer; and/or the hydroxyl groups which result from the epoxy ring opening reaction. Particularly useful are polymers having number average molecular weights of between 1000 and 50,000, preferably between 2000 and 5000, where the molecular weights are determined by gel permeation chromatography using polystyrene standards.

Examples of suitable curing agents are free radical addition polymers prepared by polymerizing a polymerizable, ethylenically unsaturated monomer having anhydride functionality such as maleic anhydride, citraconic anhydride, itaconic anhydride, propenyl succinic anhydride, etc. with other ethylenically unsaturated monomers. Examples of such ethylenically unsaturated materials include esters of acrylic and methacrylic acids such as methyl acrylate, methyl methacrylate, butyl acrylate, butyl methacrylate; vinyl compounds such as vinyl acetate and vinyl chloride; vinyl aromatic compounds such as styrene and alpha-methylstyrene; allyl compounds such as allyl chloride and allyl acetate and other copolymerizable ethylenically unsaturated monomers such as nitriles, to include acrylonitrile and methacrylonitrile; amides such as acrylamide and methacrylamide; and dienes such as 1,3-butadiene.

Additional examples of anhydride curing agents suitable for use in the curable coating compositions of the present invention are polyurethane polyanhydride oligomers prepared by reacting a hydroxyl functional 2,4-dienoate ester with a polyisocyanate under conditions to react essentially all isocyanate groups to form a polyurethane polyene. The polyurethane polyene thus prepared is reacted via Diels Alder addition, with an unsaturated polycarboxylic acid anhydride-containing material. Preparation of such polyurethane polyanhydride oligomers is described in U.S. Pat. No. 5,059,655 at column 2, line 64 to column 4, line 62; and column 4, line 65 to column 5, line 49, incorporated herein by reference.

Preferably, the curable coating composition of the invention further comprises a polyisocyanate. Useful polyisocyanates include aromatic and aliphatic polyisocyanates, including cycloaliphatic polyisocyanates. Suitable examples include diphenylmethane-4,4'-diisocyanate, 2,4- or 2,6-toluene diisocyanate, including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanates are commercially available from Bayer USA, Inc. under the trademarks MONDUR and DESMODUR.

The carboxyl functional adduct of component (a) is typically present in the curable coating compositions of invention in an amount ranging from about 10 to about 50 weight percent, preferably from about 15 to about 30 weight percent, and more preferably from about 20 to 27 weight percent based on weight of total resin solids. The anhydride functional curing agent of component (b) is typically present in the coating composition of the invention in an amount ranging from about 25 to about 75 weight percent, preferably from about 25 to about 50 weight percent, and more preferably from about 30 to about 45 weight percent based on weight of total resin solids. When employed, the polyisocyanate is typically present in the curable coating composition of the invention in an amount ranging up to about 20 weight percent, preferably from about 2 to about 10 weight percent, and more preferably from about 2 to about 5 weight percent based on weight of total resin solids. Note that any balance resin solids may comprise pigment grind vehicles.

The coating composition of the present invention can also contain a number of optional conventional ingredients such as pigments, rheology control agents, flow control agents, corrosion inhibitive pigments, adhesion promoters, catalysts, cure retarders, and fillers. A solvent or a blend of solvents is generally utilized to reduce the coating composition to an optimum spray viscosity. Examples of suitable reducing solvents include acetone, methyl ethyl ketone, methyl isobutyl ketone, methyl amyl ketone, and butyl acetate. Preferably, a blend of solvents is used.

The coating compositions of the present invention are generally organic solvent based, but they may also be water based. An amine may be used to neutralize the carboxyl groups of the adduct to form an dispersion of the polymer in water. Useful amines include dialkanolamines, alkylalkanolamines, and arylalkanolamines containing from 2 to 18 carbon atoms in the alkanol, alkyl, and aryl chains. Specific examples include N-ethylethanolamine, N-methylethanolamine, diethanolamine, N-phenylethanolamine and diisopropanolamine.

The coating compositions of the present invention can be applied to a variety of substrates by any of the conventional coating application techniques such as brushing, spraying, dipping, or flow coating, but it is preferred that spray application be used since this generally provides optimum appearance. Any of the known spray techniques may be employed such as compressed air spraying and airless spraying, including manual and automatic methods. Also electrostatic spray techniques may be used. The coating composition is typically applied such that the dry film thickness of the coating is in the range of about 15 to 200 microns.

The coating compositions may be cured, preferably at ambient temperature, or at elevated temperatures ranging from about 40 to 170° C. for about 10 to 60 minutes. Essentially complete cure can generally be achieved in about three to four hours at ambient conditions. For purposes of this invention, essentially complete cure is intended to mean the attainment of satisfactory performance properties even though the crosslinking reaction may not have reached completion.

The coating compositions of the present invention are particularly advantageous as primer coating compositions for automotive refinish applications. The compositions can be applied directly to bare metal surfaces and, after being allowed to cure and the finish prepared such as by sanding, coated directly with a pigmented topcoat composition or "color plus clear" topcoat system. The coating compositions of this invention may also be used as a pigmented topcoat composition or as the pigmented base coat composition and/or clear topcoat composition in a "color plus clear" system.

As above-mentioned, the present invention also provides a coated article comprising a metallic substrate, such as cold-rolled steel and, preferably, zinc coated substrate, and a cured coating thereon, the cured coating being derived from the aforementioned coating composition.

The invention will further be described by reference to the following examples which are presented for the purpose of illustration only and are not intended to limit the scope of the invention.

EXAMPLES

Example A describes the preparation of a carboxylic acid functional group-containing polymer for use in the coating compositions of the invention. Example 1 describes the preparation of two primer coating compositions of the invention which employ the carboxylic acid functional group-containing polymer of Example A. and an anhydride functional curing agent. Example 1-A contains the addition of a polyisocyanate, while Example 1-B contains no polyisocyanate. Table I illustrates the improvement in adhesion to electrogalvanized steel substrates provided by the coating compositions of Examples 1-A and 1-B as compared to a control. Also, the data show the improved adhesion to cold rolled steel substrates provide by the inclusion of polyisocyanate in the primer coating compositions of Example 1-A.

Example 2 describes the preparation of three coating compositions of the invention and Example 3 is provided as a comparative example. Examples 2A, 2B, and 2C describe the preparation of primer coating compositions of the invention wherein each contains a different commercially available polyisocyanate at the same level. Comparative Example 3 contains no polyisocyanate. Table II illustrates that the primer compositions of Examples 2A, 2B, and 2C are superior to commercial refinish primers with respect to adhesion properties, while maintaining adhesion to galvanized steel and Galvanealed steel approximately equal to that of the commercial chrome wash primer system. Table II also illustrates the advantages provided by the polyisocyanate-containing compositions of Examples 2A, 2B, and 2C for adhesion over cold rolled steel substrates.

EXAMPLE A

This example describes the preparation of a carboxylic acid functional group-containing polyepoxide polymer for use in the coating compositions of the invention. A chain extended polyepoxide polymer was prepared by adding to a suitably equipped reaction flask, 1.06 moles of EMPOL 1008® (a dimer acid containing 94% of $C_{36}$ dibasic acid, 3% of $C_{54}$ polybasic acid and 3% monobasic acid having a molecular weight of about 590 commercially available from Henkel Corporation), 1.55 moles of EPON® 828 (polyglycidyl ether of Bisphenol A, commercially available from Shell Oil and Chemical Co.), 166 grams of xylene, 864.9 grams of propylene glycol monomethyl ether (commercially available as DOWANOL PM from Dow Chemical Co.) and 14.0 grams of ethyltriphenyl phosphonium iodide. The mixture was stirred with a light nitrogen sparge while heating to 120° C. The mixture was then held at this temperature till the epoxy equivalent weight reached about 2500 and the acid value was below 0.2. To the resultant polyepoxide polymer was added 102.0 grams of citric acid, and the mixture was cooled to 90° C. The mixture was held at this temperature until an acid value in the range of 21–25 was reached. The citric acid modified polymer had a solids content of about 57% by weight.

EXAMPLE 1

Two automotive refinish primer coating compositions of the present invention were prepared using the carboxylic acid functional group-containing polyepoxide polymer of Example A. The coating composition of Example 1-A contains a polyisocyanate while the composition of Example 1-B contains no polyisocyanate. The primer coating compositions were prepared from a mixture of the following ingredients:

| Ingredients | Example 1-A (Parts by Weight) | Example 1-B (Parts by Weight) |
| --- | --- | --- |
| Grind Paste: | | |
| Acrylic polyol[1] | 10.5 | 10.7 |
| Butyl acetate | 9.2 | 9.4 |
| Ethyl acetate | 1.9 | 1.9 |
| Polyethylene wax solution[2] | 0.4 | 0.4 |
| Soya Lecithin[3] | 0.01 | 0.01 |
| BENTONE SD-2[4] | 0.4 | 0.4 |
| Caron black[5] | 0.1 | 0.1 |
| Fumed silica[6] | 0.5 | 0.5 |
| Talc[7] | 6.9 | 7.0 |
| Titanium dioxide[8] | 5.2 | 5.3 |
| Zinc ortho phosphate[9] | 2.8 | 2.9 |
| Hydrated iron oxide[10] | 1.1 | 1.1 |
| Calcium carbonate[11] | 6.9 | 7.0 |
| Xylene | 4.4 | 5.3 |
| Acetone | 0.7 | 0.7 |
| Butyl benzyl phthalate[12] | 1.3 | 1.3 |
| Toluene | 3.5 | 3.6 |
| Vinyl chloride acetate[13] | 0.6 | 0.6 |
| Ethyltriphenylphosphonium acetate[14] | 0.1 | 0.1 |
| Resin: | | |
| Citric acid modified polyepoxide polymer of Example A | 9.6 | 9.7 |
| Methyl isobutyl ketone | 8.6 | 8.8 |

-continued

| Ingredients | Example 1-A (Parts by Weight) | Example 1-B (Parts by Weight) |
|---|---|---|
| Hardener: | | |
| Polyurethane polyanhydride[15] | 15.6 | 15.8 |
| Methyl isobutyl ketone | 8.3 | 8.4 |
| Additive: | | |
| DESMODUR N 3400[16] | 1.4 | — |

[1]Acrylic polyol containing 23 weight percent styrene, 21.4 weight percent diethylaminoethyl methacrylate, 18.8 weight percent methyl methacrylate, 17.9 weight percent hydroxyethyl acrylate, 9.2 weight percent 2-ethylhexyl acrylate, 9.2 weight percent 2-ethylhexyl methacrylate, and 0.5 weight percent TONE M-100 (adduct of caprolactone and acrylic acid commercially available from Union Carbide, Inc.).
[2]AC-629 polyethylene wax available from Allied Signal reduced to 20 weight percent in xylene.
[3]Bleached soya lecithin available from American Lecithin.
[4]Organophilic clay available from Rheox.
[5]Commercially available from Phelps Dodge, Inc. as RAVEN ® 410.
[6]Fumed silica commercially from PPG Industries, Inc. as LOVEL ® 27.
[7]Magnesium silicate available from Barretts Minerals.
[8]Commercially available from E. I. du Pont de Nemours and Co. as R-960-38.
[9]Commercially available from Heubach as ZINC PHOSPHATE ZP 20.
[10]Commercially available from Bayer Corp. as 130M.
[11]Commercially available from Georgia Marble.
[12]Commercially available from Solutia, Inc.
[13]Commercially available from Union Carbide, Inc.
[14]Commercially available from Morton Chemicals.
[15]Polyurethane based anhydride consisting of 55 weight percent isophorone diisocyanate, 26 weight percent hydroxy propyl sorbate, 5 weight percent 1,6 hexanediol, 14 weight percent maleic anhydride as described in U.S. Pat. No. 5,059,655.
[16]Polyisocyanate commercially available from Bayer Corp.

The grind paste was prepared by combining the ingredients in a suitable vessel under high speed agitation using a cowles blade. Agitation was continued at a high speed for 30 minutes until a Hegman grind of 5 to 5.5 w as obtained. At this time, the citric acid modified polyepoxide polymer and methyl isobutyl ketone were added and mix ed with the grind paste under agitation. The polyanhydride hardener and DESMODUR N 3400 was added just prior to spray application.

The primer compositions of this example were spray applied directly to test panels (cold rolled steel and electrogalvanized steel), topcoated with a color coat, and then evaluated for cross-hatch adhesion and humidity blister resistance. Each test panel was sanded with 80 grit sandpaper prior to primer application, then solvent-wiped with DX-330, an aliphatic solvent blend containing oleic acid commercially available from PPG Industries, Inc .

The primer compositions were spray applied directly to each test panel to a dry film thickness of 2.0 to 4.0 mils and cured for 60 to 90 minutes at ambient temperature. (NO CHROME WASH PRIMER WAS USED PRIOR TO APPLICATION OF THE PRIMER COATING COMPOSITIONS OF EXAMPLES 1-A AND 1-B). Tack-free time was evaluated in increments of 5 minutes, by lightly touching the freshly primed panels. Time reported was the time expired until the primer surface was no longer sticky to the touch.

The primed panels were subsequently wet-sanded with 360 grit sandpaper by hand. The sanded panels were then topcoated with DBU-9700® base coat, commercially available from PPG Industries, Inc., to a film thickness of about 0.2 to about 0.4 mils and cured for 45 to 60 minutes at ambient temperature. The basecoated panels were then topcoated with DCU-2001/DFX-7° clear coat, commercially available from PPG Industries, Inc., to a film thickness of 2.0 to 3.0 mils and allowed to cure for 96 to 168 hours at ambient temperature prior to testing.

Cross-hatch adhesion was evaluated both before and after 96 hours of humidity exposure (110° F and 100% relative humidity) whereby the coating was scribed with eleven parallel cuts through the film, 1 millimeter apart, using a Gardner Cross Cut Tester Model P-A-T, fitted with a PA-2056 blade (both available from Gardco, Pompano Beach, Fla.). Eleven similar cuts were made at 90 degrees and crossing the first eleven cuts. Permacel 99 tape was applied over the cuts by pressing down firmly against the coating to eliminate voids and air pockets. The tape was then sharply pulled off at a 180 degree angle to the plane of the coated surface. Adhesion was rated on a graduated scale of 0 to 10 (with 0 representing complete loss of adhesion and 10 representing no loss of adhesion). The test panels were also evaluated for blistering after the 96 hours of humidity exposure. The results are reported in the following Table I.

TABLE I

| Primer | Substrate | Adhesion | | Humidity |
| | | Dry | Humidity | Blistering |
|---|---|---|---|---|
| Example 1-A | Cold Rolled | 10 | 10 | None |
| Example 1-A | Electrogalvanized | 8 | 10 | None |
| Example 1-B | Cold Rolled | 8 | 0 | None |
| Example 1-B | Electrogalvanized | 7 | 9 | None |
| Control* | Cold Rolled | 6 | 9 | None |
| Control* | Electrogalvanized | 5 | 5 | None |

*An analogous set of test panels were coated with NCT-250/NCX-255 ®, a commercial automotive refinish primer (which utilizes hydroxyl-anhydride cure) available from PPG Industries, Inc. and topcoated as described above for Examples A-1 and A-2.

The data reported in Table I illustrates that the primer composition of Example 1-A and 1-B are superior to an analogous commercial refinish primer for adhesion to electrogalvanized steel substrates. In addition, the data illustrates that the inclusion of a polyisocyanate in the primer coating composition of Example 1-A improves adhesion of the primer to cold rolled steel substrates.

EXAMPLES 2 AND 3

Four automotive refinish primer coating compositions were prepared as described below. Examples 2A, 2B and 2C each contain a different polyisocyanate component, while comparative Example 3 contains no polyisocyanate. The primer coating compositions were prepared from a mixture of the following ingredients:

| Ingredients | Example 2A Parts by Weight | Example 2B Parts by Weight | Example 2C Parts by Weight | Example 3 Parts by Weight |
|---|---|---|---|---|
| Grind Paste of Example[1] | 56.5 | 56.5 | 56.5 | 57.3 |
| Resin: | | | | |
| Citric acid modified polyepoxide polymer[1] | 9.6 | 9.6 | 9.6 | 9.7 |
| Methyl isobutyl ketone | 8.6 | 8.6 | 8.6 | 8.8 |
| Hardener: | | | | |
| Polyurethane polyanhydride | 15.6 | 15.6 | 15.6 | 15.8 |
| Methyl isobutyl ketone | 8.3 | 8.3 | 8.3 | 8.4 |

-continued

| Ingredients | Example 2A Parts by Weight | Example 2B Parts by Weight | Example 2C Parts by Weight | Example 3 Parts by Weight |
| --- | --- | --- | --- | --- |
| Additive: | | | | |
| DESMODUR N 3400 | 1.4 | — | — | — |
| TOLONATE HDT-LV[2] | — | 1.4 | — | — |
| DCX-61[3] | — | — | 1.4 | — |

[1]Carboxylic acid functional polyol containing 51 weight percent EMPOL 1008 (dimer acid commercially available from Henkel Corp.), 40 weight percent EPON 828 (polyglycidyl ether of Bisphenol A commercially available from Shell Oil and Chemical Co.), and 8 weight percent citric acid.
[2]Polyisocyanate trimer of isophorone diisocyanate ("IPDI") commercially available from Rhone Poulenc, USA.
[3]Polyisocyanate hardener commercially available from PPG Industries, Inc. consisting of a 50/50 (wt./wt.) blend of an isocyanurate of IPDI (IT-1072 commercially available from Olin Chemicals, USA) and hexamethylene diisocyanate dimer/trimer (HDT-LV commercially available from Rhone Poulenc).

The primer compositions of these examples were prepared, applied and tested as described above for those of Example 1. Test results are provided in the following Table II.

TABLE II

| Primer | Substrate | Tack-free Time (minutes) | Adhesion Dry | Adhesion Humidity | Humidity Blistering |
| --- | --- | --- | --- | --- | --- |
| Example 2A | Cold Rolled | 10 | 10 | 10 | None |
| Example 2A | Electro-galvanized | 10 | 8 | 10 | None |
| Example 2B | Cold Rolled | 10 | 10 | 9 | None |
| Example 2B | Electro-galvanized | 10 | 10 | 10 | None |
| Example 2C | Cold Rolled | 10 | 10 | 5 | None |
| Example 2C | Electro-galvanized | 10 | 10 | 10 | None |
| Example 3 | Cold Rolled | 10 | 8 | 0 | None |
| Example 3 | Electro-galvanized | 10 | 7 | 9 | None |
| Control* | Cold Rolled | 5 | 6 | 9 | None |
| Control | Electro-galvanized | 5 | 5 | 5 | None |
| DP1791/K36** | Cold Rolled | 40 | 10 | 10 | None |
| DP1791/K36 | Electro-galvanized | 40 | 10 | 10 | None |

*comparative set of panels were coated with a primer commercially available from PPG Industries, Inc. as NCT-250/NCX-255 ® (which utilizes hydroxyl-anhydride cure) prior to topcoating as described above.
**comparative set of panels were first coated with a chrome wash primer commercially available from PPG Industries, Inc. as DP-1791 and then coated with K-36 refinish primer (which utilizes hydroxylisocyanate cure) prior to topcoating as described above.

The data reported above in Table II illustrate that the primer compositions of Examples 2A, 2B, and 2C which each contains a polyisocyanate component are superior to commercial refinish primers with respect to adhesion properties, while maintaining adhesion to galvanized steel and Galvanealed steel approximately equal to that of the commercial chrome wash primer system. The data also illustrate that the polyisocyanate containing primer coatings of Examples 2A, 2B, and 2C provide adhesion to cold rolled steel substrates superior to that of Example 3, which is the same composition without a polyisocyanate component. Additionally, the data also illustrate that the primers which comprise an anhydride curing agent had tack-free times which were superior to that of the commercial control primer (K-36) which comprises an isocyanate curing agent and no anhydride curing agent.

What is claimed is:

1. A curable coating composition comprising the following components:

(a) a carboxyl functional adduct comprising the reaction product of the following reactants:
      (i) a compound, polymer or oligomer containing pendant and/or terminal hydroxyl or epoxy functional groups; and
      (ii) a material selected from the group consisting of citric acid anhydride and citric acid, wherein the carboxyl functionality of the adduct is in a terminal and/or pendant position and is derived from the reaction of the hydroxyl functional groups with citric acid anhydride and/or the reaction of the epoxy functional groups with citric acid; and (b) an anhydride functional curing agent.

2. The curable coating composition of claim 1 wherein reactant (i) is an acrylic polymer containing pendant and/or terminal hydroxyl or epoxy functional groups.

3. The curable coating composition of claim 1 wherein reactant (i) is a polyester polymer containing pendant and/or terminal hydroxyl or epoxy functional groups.

4. The curable coating composition of claim 1 wherein reactant (i) is a polyglycidyl ether of a cyclic polyol containing pendant and/or terminal epoxy groups.

5. The curable coating composition of claim 1 wherein reactant (i) is an acrylic monomer containing pendant and/or terminal hydroxyl groups.

6. The curable coating composition of claim 1 further comprising at least one pigment.

* * * * *

UNITED STATES PATENT AND TRADEMARK OFFICE
CERTIFICATE OF CORRECTION

PATENT NO. : 6,084,036
DATED : July 4, 2000
INVENTOR(S) : Carney et al.

It is certified that error appears in the above-identified patent and that said Letters Patent is hereby corrected as shown below:

Title page,
Item [56], under "References Cited, U.S. PATENT DOCUMENTS", please include the listing of references by adding the following:

| Document No. | Date | Name | Class | Subclass |
|---|---|---|---|---|
| 3,306,883 | 02/1967 | Ravve et al. | 260 | 78.5 |
| 3,819,562 | 06/1974 | Cargagna | 260 | 33.4 R |
| 3,922,253 | 11/1975 | Jerabek et al. | 260 | 77.5 TB |
| 4,001,156 | 01/1977 | Bosso et al. | 260 | 29.2 EP |
| 4,031,050 | 06/1977 | Jerabek | 260 | 29.2 TN |
| 4,324,715 | 04/1982 | Emerick | 523 | 400 |
| 4,468,307 | 08/1984 | Wismer et al. | 204 | 181 C |
| 4,650,718 | 03/1987 | Simpson et al. | 428 | 413 |
| 4,711,917 | 12/1987 | McCollum et al. | 523 | 400 |
| 4,798,745 | 01/1989 | Martz et al. | 427 | 407.1 |
| 4,798,746 | 01/1989 | Claar et al. | 427 | 407.1 |
| 4,931,157 | 06/1990 | Valko et al. | 204 | 181.7 |
| 4,931,509 | 06/1990 | Yagishita et al. | 525 | 208 |
| 5,306,567 | 04/1994 | Kuo et al. | 428 | 482 |
| 5,498,685 | 03/1996 | Carlson et al. | 528 | 71 |
| 5,239,012 | 08/1993 | McEntire et al. | 425 | 327.7 |

Under FOREIGN PATENT DOCUMENTS, please correct the listing of references by adding the following references to the cited Japanese reference:

| Document No. | Date | Country |
|---|---|---|
| 711592 | 07/1954 | Great Britain |
| 63-030569 | 09/1988 | Japan |

UNITED STATES PATENT AND TRADEMARK OFFICE
CERTIFICATE OF CORRECTION

PATENT NO.   : 6,084,036
DATED        : July 4, 2000
INVENTOR(S)  : Carney et al.

It is certified that error appears in the above-identified patent and that said Letters Patent is hereby corrected as shown below:

<u>Column 1, claim 1,</u>
Line 25, delete "compound" and "or oligomer"
Line 27, after "groups", insert -- selected from the group consisting of 1) an acrylic polymer, 2) a polyester, 3) a polyepoxide and 4) an acrylic monomer containing pendant and/or terminal hydroxyl groups, wherein after reaction with material (ii) to form a carboxyl functional adduct, at least one other ethylenically unsaturated monomer is polymerized with the adduct in the presence of a free radical initiator to form a carboxyl functional polymer adduct --.

Signed and Sealed this

Thirteenth Day of November, 2001

Attest:

*Nicholas P. Godici*

NICHOLAS P. GODICI
*Attesting Officer*   *Acting Director of the United States Patent and Trademark Office*